(12) United States Patent
Feller et al.

(10) Patent No.: US 9,489,377 B1
(45) Date of Patent: Nov. 8, 2016

(54) INFERRING RECIPE DIFFICULTY (71) Applicant: Yummly, Inc., Redwood City, CA (US)

(72) Inventors: David B. Feller, Mountain View, CA (US); Vadim Geshel, Redwood City, CA (US); Gregory Allen Druck, Jr., San Francisco, CA (US)

(73) Assignee: Yummly, Inc., Redwood City, CA (US)

( * ) Notice: Subject to any disclaimer, the term of this patent is extended or adjusted under 35 U.S.C. 154(b) by 228 days.

(21) Appl. No.: 14/336,563

(22) Filed: Jul. 21, 2014

Related U.S. Application Data (60) Provisional application No. 61/943,238, filed on Feb. 21, 2014.

(51) Int. Cl.
 *G06Q 30/06* (2012.01)
 *G06F 17/27* (2006.01)
 *G06F 17/22* (2006.01)

(52) U.S. Cl.
 CPC ....... *G06F 17/2785* (2013.01); *G06F 17/2247* (2013.01); *G06Q 30/0631* (2013.01)

(58) Field of Classification Search
 CPC .............. G06Q 30/0631; G06F 17/27; G06F 17/2755; G06F 17/2785; G06F 17/279
 See application file for complete search history.

(56) References Cited

U.S. PATENT DOCUMENTS

| | | | | |
|---|---|---|---|---|
| 6,975,910 B1* | 12/2005 | Brown | ................ | G06F 19/3475 700/90 |
| 2002/0107684 A1* | 8/2002 | Gao | ........................ | G06F 8/51 704/4 |
| 2003/0045951 A1* | 3/2003 | Luk | ..................... | G06N 99/005 700/86 |
| 2003/0046188 A1* | 3/2003 | Orozco | ................... | G06Q 30/02 705/14.38 |
| 2004/0181427 A1* | 9/2004 | Stobbs | ................ | G06F 17/2785 705/36 R |
| 2005/0114859 A1* | 5/2005 | Srinivasa | ............... | G06Q 10/10 718/100 |
| 2007/0112554 A1* | 5/2007 | Goradia | ............. | G06F 17/2735 704/4 |
| 2010/0179881 A1* | 7/2010 | Wiederstein | ......... | G06Q 10/087 705/26.1 |
| 2011/0119130 A1* | 5/2011 | Agan | ..................... | G06Q 10/10 705/14.49 |
| 2012/0150534 A1* | 6/2012 | Sheehan | ............... | G06F 17/274 704/9 |
| 2013/0149675 A1* | 6/2013 | Slone | ..................... | G09B 19/00 434/127 |
| 2013/0282628 A1* | 10/2013 | Bengfort | ................. | G06F 15/18 706/12 |

(Continued)

OTHER PUBLICATIONS

Andrew, G. et al., "Scalable Training of $L_1$-Regularized Log-Linear Models," Proceedings of the 24$^{th}$ International Conference on Machine Learning, 2007, pp. 33-40.

(Continued)

*Primary Examiner* — Eric Yen (74) *Attorney, Agent, or Firm* — Fenwick & West LLP (57) ABSTRACT

Embodiments infer a difficulty attribute of a recipe. A recipe is obtained that includes recipe content such as preparation steps and ingredients. A recipe server identifies attribute features in the recipe content, where the attribute features are representative of portions of the recipe content that are correlated with difficulty attributes. The recipe server determines whether the recipe is associated with a difficulty attribute based on the attribute features and obtained attribute parameters corresponding to the attribute features. A difficulty attribute determined to be associated with a recipe is transmitted to a client device in response to a request for the recipe. The estimated difficulty attribute is used to filter recipes sent in response to a request for recipes, where the request specifies a criterion based on the difficulty attribute. The estimated difficulty attribute is used to select recipes for recommendation to a user based on that user's preferences.

20 Claims, 7 Drawing Sheets

(56) References Cited

U.S. PATENT DOCUMENTS

2014/0081955 A1* 3/2014 Osaki .................... G06Q 10/10
707/722
2014/0280148 A1* 9/2014 Stankiewicz ....... G06F 17/3071
707/737

OTHER PUBLICATIONS

Badra, F. et al., "TAAABLE: Text Mining, Ontology Engineering, and Hierarchical Classification for Textual Case-Based Cooking," In ECCBR Workshops, 2008, pp. 219-228.

Bridge, D. et al., "The Ghostwriter-2.0 Case-Based Reasoning System for Making Content Suggestions to the Authors of Product Reviews," Knowledge-Based Systems, May 2012, pp. 93-103, vol. 29.

Burges, C. et al., "Learning to Rank Using Gradient Descent," In Proceedings of the 22nd International Conference on Machine Learning, ICML '05, New York, NY, USA, ACM, 2005, pp. 89-96.

Druck, G. et al., "Spice It Up? Mining Refinements to Online Instructions from User Generated Content," In Proceedings of the 50th Annual Meeting of the Association for Computational Linguistics (ACL 2012), Jul. 8-14, 2012, pp. 545-553.

Forbes, P. et al., Content-Boosted Matrix Factorization for Recommender Systems: Experiments with Recipe Recommendation, In Proceedings of the Fifth ACM Conference on Recommender Systems, RecSys '11, New York, NY, USA, ACM, Oct. 23-27, 2011, pp. 261-264.

Freyne, J. et al., "Recipe Recommendation: Accuracy and Reasoning," In Proceedings of the 19th International Conference on User Modeling, Adaption, and Personalization, UMAP' 11, LNCS 6787, 2011, pp. 99-110.

Herbrich, R. et al., "Large Margin Rank Boundaries for Ordinal Regression," Advances in Large Margin Classifiers, Eds. Smola, A.J. et al., MIT Press, Cambridge, MA, 2000, 20 pages.

Joachims, T., "Optimizing Search Engines Using Clickthrough Data," In KDD '02: Proceedings of the Eighth ACM SIGKDD International Conference on Knowledge Discovery and Data Mining, ACM, 2002, pp. 133-142.

Teng, C.Y. et al., "Recipe Recommendation Using Ingredient Networks," CoRR, abs/1111.3919, 2011, 10 pages.

Ueda, M. et al., "User's Food Preference Extraction for Cooking Recipe Recommendation," In SPJM, 2011, pp. 98-105.

Wang, L. et al., "Substructure Similarity Measurement in Chinese Recipes," In Proceedings of the 17th International Conference on World Wide Web, WWW '08, Beijing, China, Apr. 21-25, 2008, pp. 979-988.

Zhang, Q. et al., "Back to the Future: Knowledge Light Case Base Cookery," ECCBR Workshops, Proceedings of the Workshop on the Computer Cooking Contest, $9^{th}$ European Conference on Case-Based Reasoning, Schaaf, M. (Ed.), Jan. 1, 2008, pp. 239-248.

* cited by examiner

INFERRING RECIPE DIFFICULTY

CROSS-REFERENCE TO RELATED APPLICATION

This application claims the benefit of U.S. Provisional Application No. 61/943,238, filed Feb. 21, 2014, which is hereby incorporated by reference in its entirety.

BACKGROUND

1. Field of Disclosure

This disclosure relates generally to natural language understanding and more particularly to inferring attributes of a recipe.

2. Description of the Related Art

Although recipes are available from many sources (e.g., the Internet), such recipes do not have a standard format and may omit various characteristics of a recipe such as the difficulty of preparing the recipe. A recipe's difficulty is a relevant attribute for recipe readers, who may choose to avoid a recipe with a difficulty beyond a reader's skill level. Other readers may seek more difficult recipes to develop cooking skills.

Some recipes have associated metadata indicating recipe attributes. For example, a header of a HyperText Markup Language (HTML) page describing a recipe includes metadata tags indicating a recipe's difficulty. Unfortunately, such metadata is available only for a subset of recipes, and even those recipes with metadata often do not include metadata indicating recipe difficulty. Other recipes may include explanations indicating the author's opinion on the recipe's difficulty. These comments may be difficult to efficiently interpret through an automated process given many possible ways of expressing that a recipe is easy or difficult.

Even if a recipe indicates whether a recipe's author (or a recipe collection's editor) considers the recipe easy or difficult, this classification is subjective. The cooking skill and experience of different recipe authors vary, so recipes designated as easy by a skilled recipe author may be difficult for an inexperienced cook. For example, an "easy" recipe from *Modernist Cuisine* may be intractably difficult for a typical cook without access to a centrifuge or a rotary evaporator. Hence, author-designated recipe difficulties may be inaccurate whether included in metadata of a recipe or in explanatory text accompanying a recipe.

SUMMARY

Embodiments infer difficulty of a recipe. A recipe that includes ingredients and preparation steps is obtained. The preparation steps describe how to prepare the ingredients into a food item described by the recipe. Attribute features in the preparation steps are generated from the ingredients or the preparation steps. These attribute features are correlated to a difficulty attribute of a recipe. Attribute parameters corresponding to generated attribute features in an attribute model are obtained. An obtained attribute parameter is specific to the difficulty attribute. Whether the recipe is associated with the difficulty attribute is determined by using the generated features as inputs to the attribute model modified by the obtained attribute parameters. The difficulty attribute is stored in association with the recipe if the difficulty attribute is determined to be associated with the recipe by the attribute model.

A difficulty attribute associated with a recipe may be transmitted to a client device in response to a request for the recipe from the client device. In one embodiment, a request for recipes having a difficulty attribute is received from a client device. The recipe is transmitted to the client device in response to determining that the recipe is associated with the difficulty attribute. In one embodiment, it is determined whether multiple recipes are associated with the difficulty attribute. A subset of these recipes is selected for recommendation to the user based on whether they are associated with the difficulty attribute and user preferences of the user.

In one embodiment, the obtained attribute parameters associated with preparation steps are determined using an attribute model. Training attribute features are identified in training recipes having known training attribute indicators of particular difficulty attributes, and the attribute model is trained to predict the presence of the particular difficulty attributes from the identified training attribute features. In one embodiment, the attribute model is a logistic regression between the training attribute features and the known difficulty attributes.

Embodiments include methods of inferring a difficulty attribute of a recipe from content of that recipe. Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIGS.) and the following description describe certain embodiments by way of illustration only. One skilled in the art will readily recognize from the following description that alternative embodiments of the structures and methods illustrated herein may be employed without departing from the principles described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

Recipe Extraction Environment

Figure 1:
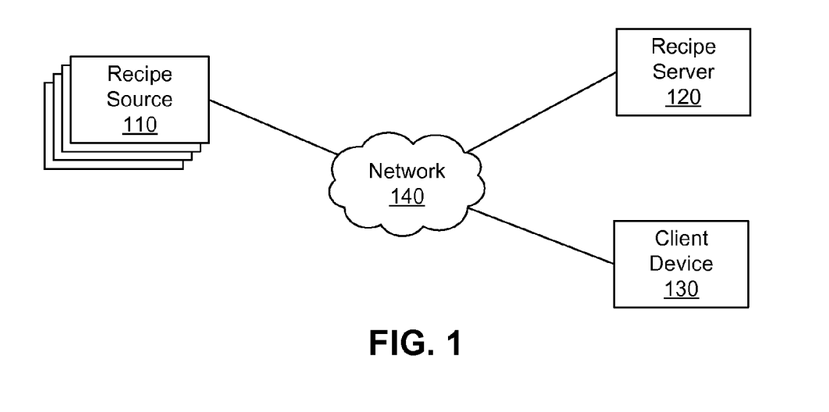
FIG. 1 is a high-level block diagram illustrating an environment for estimating difficulty attributes of recipes, in accordance with an embodiment.

FIG. 1 is a high-level block diagram illustrating an environment 100 for estimating difficulty attributes of recipes, in accordance with an embodiment. The environment 100 includes entities such as recipe sources 110, a recipe server 120, a client device 130, and a network 140. Although single instances of some of the entities are illustrated, multiple instances may be present. For example, multiple client devices 130 associated with multiple users may access recipes through the recipe server 120. The functionalities of the entities may be distributed among multiple instances. For example, a content distribution network (or a cloud-based network) of servers at geographically dispersed locations implements the recipe server 120 to increase server responsiveness.

A recipe source 110 is a repository of recipes accessible by the recipe server 120. Recipes are media describing preparation of a food item through text, images, video, animations, or other media. A food item is typically an edible substance consumed for nutrition or gustatory sensation and includes both solid and non-solid food items (e.g., beverages). In one embodiment, the recipe source 110 is a server hosting a webpage displaying recipes through a markup language (e.g., HTML) or another structured document format. A recipe source 110 may implement an application programming interface (API) functionality to provide recipe access to applications native to an operating system on a client device 130. The recipe source 110 may be implemented using a server, described further with respect to FIG. 8.

Alternatively or additionally, a recipe source 110 is a repository containing recipes in a structured document format. The repository may be a non-transitory computer-readable storage medium (e.g., a hard disk drive, an optical disc, a flash memory) accessible to the recipe server through the network 140 or through a removable storage media interface. Non-transitory computer-readable storage media are further described with respect to FIG. 8.

The recipe server 120 hosts recipes for display to the user of a client device 130. In one embodiment, the recipe server 120 retrieves recipes from a recipe source 110 and analyzes the recipes to enable more uniform presentation through client devices 130 and to enable more efficient organization of recipes. The recipe server 120 may also infer properties of a recipe such as nutritional content, preparation time, expected number of servings, or attributes of a recipe such as difficulty of preparing the recipe. Inferred properties of a recipe may be presented through a client device 130 along with the contents of a recipe. Attributes of a recipe are characteristics of the food item described by a recipe or of the preparation process described by the recipe. Attributes of a recipe include its difficulty and its flavor as well as culinary groupings of a food item by tradition (e.g., cuisine), by time (e.g., typical meal, related holidays) or by pairings with other food (e.g., typical course within a meal).

The recipe server 120 organizes recipes to present relevant or recommended recipes to a user of a client device 130. For example, the recipe server 120 organizes recipes to accurately interpret search queries better than a generic search algorithm. As another example, the recipe server 120 maintains a user profile to log a user's preferences, dietary restrictions, and culinary tastes. This user profile may be used to recommend items to the user and to increase relevance of search results to the user. The recipe server 120 is described further with respect to FIG. 2.

The client device 130 accesses recipes through the network 140 and presents the accessed recipes to the user. In one embodiment, the client device 130 is a computer, which is described further below with respect to FIG. 8. Example client devices 130 include a desktop, a laptop, a tablet, a mobile device, a smart television, and a wearable device. Using the client device 130, a user may access recipes on the recipe server 120. Optionally, the user of a client device 130 may search through recipes on the recipe server 120 or request recipe recommendations from the recipe server 120. The client device 130 may contain software such as a web browser or another application for viewing recipes from the recipe server 120. The client device 130 may optionally access a recipe source 110 that displays recipes through a webpage or in another accessible form through the network 140.

The network 140 enables communications among the entities connected to it through one or more local-area networks and/or wide-area networks. In one embodiment, the network 140 is the Internet and uses standard wired and/or wireless communications technologies and/or protocols. The network 140 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP). The network 140 may include multiple sub-networks linked to transfer data.

The data exchanged over the network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

Recipe Server

Figure 2:
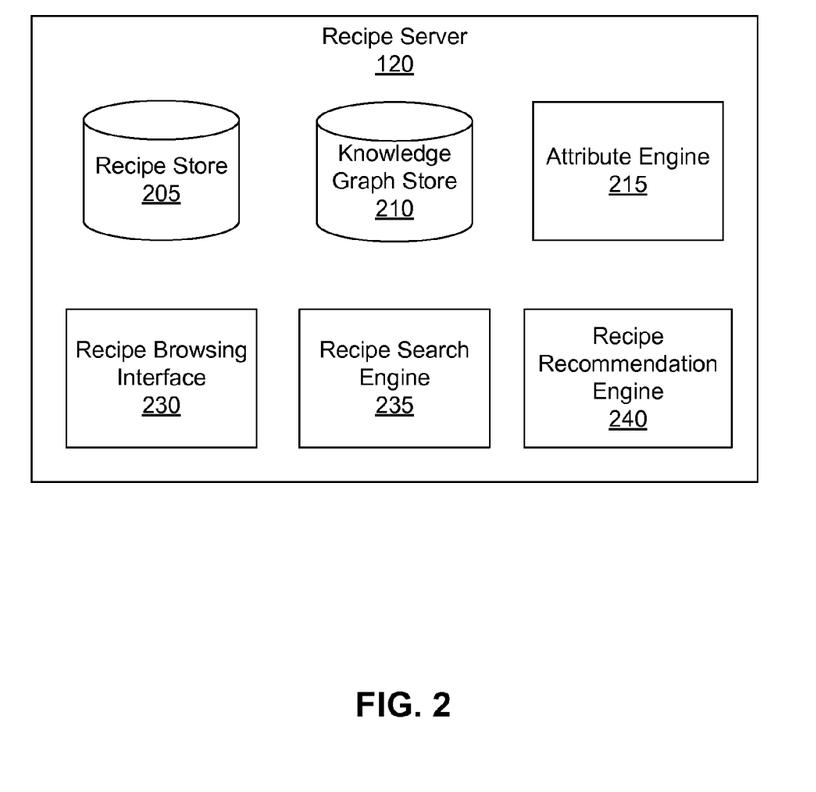
FIG. 2 is a block diagram illustrating a recipe server, in accordance with an embodiment.

FIG. 2 is a block diagram illustrating a recipe server 120, in accordance with an embodiment. The recipe server 120 includes a recipe store 205, a knowledge graph store 210, an attribute engine 215, a recipe browsing interface 230, a recipe search engine 235, and a recipe recommendation engine 240.

Recipe and Knowledge Graph Stores

The recipe store 205 contains labeled recipes. A labeled recipe includes source content of a recipe (or a pointer thereto) and classified recipe components. The source content of the recipe may be stored as a copy of the recipe from its original recipe source 110, or a pointer to the recipe on the recipe source 110. The source content of the recipe includes text of the recipe as well as accompanying images or other media (e.g., video, animations). Alternatively or additionally, the recipe store 205 contains recipes stored primarily in audio, video, or image form. A classified recipe component is content of a recipe that includes a type of information about a recipe such as its ingredients or its preparation steps. Other classified recipe components may include a number of servings, a serving size, an attribute, or a recipe title, for example.

The recipe server 120 obtains classifications of recipe components for storage in the recipe store 205. The recipe server 120 may obtain labels for recipe components from formatting metadata associated with the recipe and retrieved from the recipe source 110. Example recipe formatting metadata labels the recipe's title, ingredient block, and preparation steps. Alternatively or additionally, the recipe server 120 receives manual classifications of recipe components from a user through an interface to facilitate manual classification.

In one embodiment, the recipe server 120 separates the content of a recipe from the recipe source into segments and classifies segments as different recipe components. For example, the recipe server 120 uses a machine learning algorithm (e.g., conditional inference on a random field, logistic regression) to infer recipe component classifications from features of the recipe including its structure and occurrences of known food-related terms (such as those in the knowledge graph 210). Various techniques for classifying recipe components are described in U.S. application Ser. No. 14/284,076, filed May 21, 2014, which is incorporated by reference in its entirety. Thus, the recipe store 205 contains labeled recipes with classified recipe components The knowledge graph store 210 contains a graph representing food knowledge. Example sections of the knowledge graph are provided in FIGS. 7A and 7B. The nodes of the graph represent food-related terms such as ingredients, cooking techniques, cooking equipment, and abstractions of food-related terms. Example nodes of the graph include "apple," "Gala apple," "fruit," "slicing," "peeling," "knife," and "peeler." Example nodes representing cooking techniques include "sautéing," "searing," and "sous vide." Example nodes representing cooking equipment include a "baking stone," a "mushroom brush," and "bamboo skewers."

Abstractions are broader categories of food-related terms, such as ingredients. For example, "steak" is an abstraction of "rib-eye steak." A node may be an abstraction with respect to another node and an ingredient with respect to another node. For example, "beef" is an abstraction of "Wagyu beef," and "meat" is a further abstraction of "beef." Similar to ingredients, a node representing a cooking technique or a piece of cooking equipment may be an abstraction of a cooking technique or a piece of cooking equipment. For example, nodes representing the cooking techniques "cutting" and "cooking" are abstractions of the cooking techniques "mincing" and "browning," respectively. As another example, a "baking container" is an abstraction of the cooking equipment "muffin pan" and "cookie sheet."

A node of the food knowledge graph may contain attributes of the food-related term that the node represents. For example, nodes representing ingredients contain nutritional density information and associated allergens and dietary restrictions. Nodes representing abstractions may similarly contain average nutritional density information as well as attributes (e.g., allergens such as gluten or nuts, dietary restrictions such as halal, vegan, or kosher) common to child ingredients of a parent abstraction. As another example, nodes representing cooking techniques and cooking equipment indicate difficulty of using cooking equipment or learning a cooking technique.

The edges of the food knowledge graph may indicate relationships between nodes of the graph. The food knowledge graph has different types of edges representing different relationships, and two nodes may be connected by more than one edge. For example, one type of edge explicitly indicates the parent-child relationship between an ingredient and an abstraction (e.g., "black beans are a kind of beans"). Another type of edge between two nodes representing two ingredients indicates that the ingredients have equivalent nutritional content (e.g., "a Fuji apple is the nutritional equivalent of a Gala apple"). Edges may connect similar nodes, such as an edge representing substitutability between ingredients represented by two nodes. An edge between a node representing an ingredient and a node representing cooking equipment or a cooking technique indicates that the ingredient is commonly used with the cooking equipment or technique (e.g., "potatoes are often used with ovens," "potatoes are often baked"). Similarly, an edge between a node representing a cooking technique and a node representing cooking equipment indicates that the cooking equipment may be used in a cooking technique (e.g., "an oven is used for baking").

In addition to ingredients, abstractions of ingredients, cooking techniques, and cooking equipment, the knowledge graph may contain nodes representing units of measure (e.g., cup, ounce, cubic centimeter, pinch). These nodes may have attributes indicating common abbreviations of the unit of measure, and edges between these nodes may represent unit conversions between dimensionally consistent units of measure. Hence, the nodes, attributes of nodes, and edges between nodes serve to organize food knowledge in the knowledge graph store 210.

Inferring and Applying Recipe Attributes

The attribute engine 215 identifies properties of recipes from the recipe store 205. More specifically, the attribute engine 215 determines whether a recipe is associated with a difficulty attribute. A difficulty attribute is indicative of skill to prepare a food item described by a recipe. A difficulty attribute may indicate comprehensive difficulty as in the example difficulty attributes "easy," "medium," and "hard." Difficulty attributes may also indicate difficulty with respect to more specialized skills (e.g., difficult for someone with average pastry-making skills). Difficulty attributes may also reflect equipment available. An example difficulty attribute indicates that a recipe is difficult for someone without a particular piece of cooking equipment and easy for someone with the particular piece of cooking equipment. Attribute features are typically binary. Two example difficulty attributes indicate whether a recipe is "beginner friendly" or not and whether a recipe requires "attentiveness to subtle details" or not. In an alternative embodiment, attribute features may have numerical values (e.g., overall difficulty on an integer scale from one to five, complexity of cooking equipment needed as a percentage).

In one embodiment, the attribute engine 215 identifies attribute features correlated to the difficulty of a recipe. The attribute features may be identified using data from the knowledge graph store 210 or using natural language processing, for example. The attribute engine 215 determines whether a recipe is associated with a difficulty attribute by using the attribute features as an input to an attribute model. The attribute model produces an output that reflects whether a recipe is associated with a given difficulty attribute. The attribute model includes attribute parameters that are modified consistently with the difficulty attribute. The recipe server 120 uses difficulty attributes of a recipe in the recipe browsing interface 230, the recipe search engine 235, or the recipe recommendation engine 240.

The recipe browsing interface 230 presents an inferred difficulty attribute in an interface for browsing and searching for recipes. For example, the browsing interface 230 displays the difficulty attribute in a summary of a recipe that also includes the recipe's title and a representative image of the recipe. As another example, the browsing interface 230 presents a collection of recipes having a particular difficulty attribute (or a combination of difficulty attributes). For example, the interface 230 presents recipes having a "quick and easy" difficulty attribute as well as recipes having a "leisurely meals" difficulty attribute. To present recipes having a "quick and easy" difficulty attribute, the interface 230 also excludes recipes having an "obscure ingredients" difficulty attribute or a "specialized cooking equipment" difficulty attribute, for example. The recipe browsing interface 230 may also display the recipe attribute in a detailed view of the recipe displaying its ingredients, preparation steps, and other inferred attributes. If a client device 130 requests a recipe, then the recipe server 120 transmits the recipe including its associated difficulty attributes to the client device 130 in response.

The recipe search engine 235 may use an inferred difficulty attribute to screen recipes in response to a request for recipes. In one embodiment, the recipe search engine 235 receives a request for recipes (such as a search query) from a client device 130. The request for recipes (or search query) specifies one or more criteria containing a difficulty attribute. For example, the request specifies recipes having a particular difficulty attribute or not having a particular difficulty attribute. The recipe search engine 235 identifies recipes from the recipe store 205 that have a specified difficulty attribute or that otherwise meet the specified criteria. The identified recipes are transmitted to the client device 130. For example, recipes meeting the criteria are displayed in the recipe browsing interface 230. Other example criteria in the request for recipes could include ingredients in a recipe, dietary restrictions a recipe complies with, meals, cuisines, occasions, or recipe titles. Hence, the recipe search engine 235 provides more relevant responses to user requests for recipes.

The recipe recommendation engine 240 may use the estimated difficulty attribute to select recipes that are more relevant to a user. In one embodiment, the recipe server 120 stores user preferences including preferences for difficulty attributes of recipes. The user preferences may include deterministic rules (e.g., no difficult recipes, no recipe requiring specialized cooking equipment). The user preferences may also include features representing tendencies of a user, which may be used to calculate a recommendation score representing a recipe's appeal to a user. For example, the user preferences of a user specify enthusiasm for spicy foods and disinclination towards creamy foods, so the recipe recommendation engine 240 calculates high recommendation scores between the user and recipes with plenty of capsaicin but with low concentrations of triglycerides. The recipe recommendation engine 240 selects a subset of recipes to recommend to the user based on attributes of those recipes and user preferences of the user. For example, a user's preferences indicate that the user is partial towards recipes that have a medium difficulty but not an easy difficulty or a hard difficulty. In this example, the recipe recommendation engine 240 is more likely to select recipes for the user that are associated with a medium difficulty attribute but not with an easy or hard difficulty attribute.

The recipe recommendation engine 240 may solicit user preferences (e.g. through the recipe browsing interface 230) or may infer user preferences. For example, the recipe browsing interface 230 includes feedback mechanisms (e.g., ratings) for a user to express an opinion towards a recipe. In this example, the recipe recommendation engine 240 modifies a user's inferred preferences in concordance with ratings of recipes and difficulty attributes for rated recipes. Hence, the recipe recommendation engine 240 selects recipes for presentation to a user based in part on difficulty attributes of selected recipes and user preferences about difficulty attributes.

Attribute Engine

Figure 3:
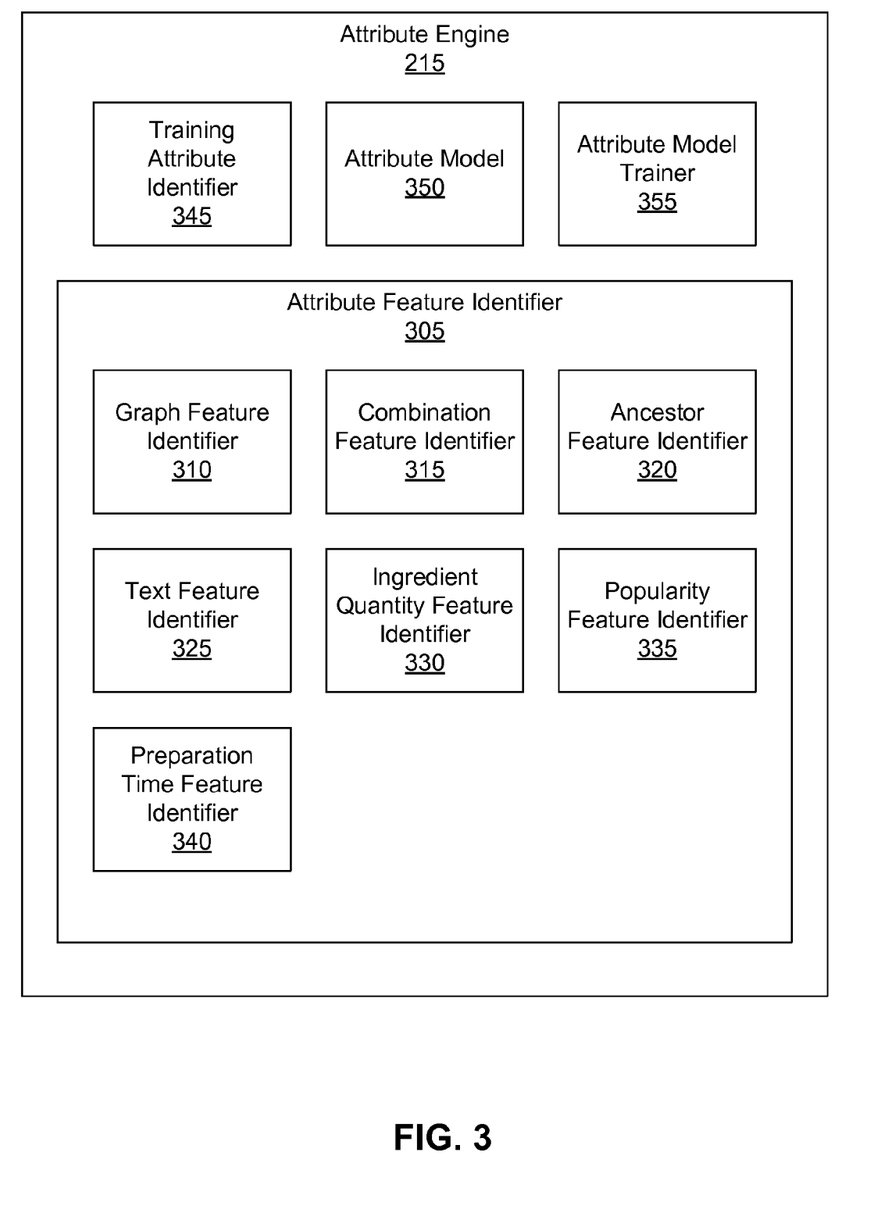
FIG. 3 is a block diagram illustrating an attribute engine, in accordance with an embodiment.

FIG. 3 is a block diagram illustrating an attribute engine 215, in accordance with an embodiment. The attribute engine 215 includes an attribute feature identifier 305, a training attribute identifier 345, an attribute model 350, and an attribute model trainer 355.

Attribute Features

The attribute feature identifier 305 generates attribute features from the content of a recipe. The attribute feature identifier 305 generates attribute features from the preparation steps, ingredients, and/or the title of a recipe as well as subjective commentary or description of a recipe. The generated attribute features are correlated with one or more difficulty attributes and are used as inputs to the attribute model 350. The attribute feature identifier includes a graph feature identifier 310, a combination feature identifier 315, an ancestor feature identifier 320, a text feature identifier 325, an ingredient quantity feature identifier 330, a popularity feature identifier 335, and a preparation time feature identifier 340.

The graph feature identifier 310 generates attribute features from text corresponding to ingredients, preparation equipment, cooking techniques, or other nodes in the knowledge graph store 210. For the example recipe preparation step "mash the potatoes with a potato ricer," the graph feature identifier 310 creates attribute features corresponding to the cooking technique "mashing" and to the cooking equipment "potato ricer." Some food-related terms may have alternative names or commercial names, but the nodes of the food knowledge graph representing the food-related terms may include these alternative or commercial names. For example, the graph feature identifier 310 recognizes a "George Foreman™ grill" as a contact grill based on a listing of known commercial names of contact grills. An example attribute feature representing a contact grill may be associated with an easy recipe, while an example attribute feature representing a charcoal grill is associated with difficult recipes.

The graph feature identifier 310 may include additional algorithms to identify cooking techniques. Because cooking techniques are typically described using verbs, they may have different forms (e.g., "baking," "bake," "bakes," "baked"). Furthermore, words that normally describe cooking techniques may be used to describe ingredients (e.g., a "baked potato"). To assist in identifying cooking techniques, the graph feature identifier 310 uses a part-of-speech classifier (e.g., the Stanford parser), the food knowledge graph, or an external dictionary.

The combination feature identifier 315 generates attribute features representing combinations of food-related terms in the food knowledge graph. Although the combination feature identifier 315 typically generates attribute features corresponding to pairs or triplets of nodes, the combination feature identifier 315 may generate attribute features corresponding to any number of nodes. Similar to the graph feature identifier 310, the combination feature identifier 315 matches the content of a recipe to nodes of the food knowledge graph. An example attribute feature corresponding to the pairing of the ingredient "egg" and the cooking technique "poaching" may be associated with a "hard"

difficulty attribute. An example attribute feature corresponding to the pairing of the ingredient "egg" and the cooking technique "boiling" may be associated with an "easy" difficulty attribute.

The ancestor feature identifier 320 generates attribute features corresponding to abstractions in the food knowledge graph. Similar to the graph feature identifier 310, the ancestor feature identifier 320 recognizes food-related terms in the content of a recipe that match nodes in the food knowledge graph. The ancestor feature identifier 320 then generates a feature corresponding to an abstraction of the node matching the content of the recipe. For example, the ancestor feature identifier 320 recognizes the text "weisswurst" in a recipe and generates an attribute feature corresponding to the abstraction "sausage." Attribute features corresponding to abstractions improve results for recipes having uncommon ingredients, cooking equipment, or other food-related terms.

The text feature identifier 325 generates attribute features corresponding to text in a recipe that is not represented in the food knowledge graph. The text feature identifier 325 identifies strings of text matching strings that correspond to an attribute feature. For example, an attribute feature corresponding to the text "rare" indicates that a recipe is more likely to be associated with a "hard" difficulty attribute. As another example, an attribute feature corresponding to the text "well done" indicates that a recipe is likely to be associated with an "easy" difficulty attribute. Multiple strings may map to the same attribute feature to account for variations in a term.

The ingredient quantity feature identifier 330 generates attribute features corresponding to the number or quantity of ingredients in a recipe. The quantity feature identifier 330 generates attribute features indicating deviation from normal quantities of an ingredient. For example, a recipe calling for 20 pounds of spaghetti should be associated with an "industrial kitchen" difficulty attribute and not a "home kitchen" difficulty attribute. The ingredient quantity feature identifier 330 may also generate features from a number of servings indicated by a recipe. An example attribute feature corresponding to a recipe making more than fifty servings is correlated with the example "industrial kitchen" attribute. The ingredient feature identifier 330 may generate features corresponding to the number of ingredients in a recipe. For example, a recipe having fewer ingredients (e.g., a grilled cheese sandwich) is likely to be associated with an "easy" difficulty attribute, and a recipe having many ingredients (e.g., a turducken) is likely to be associated with a "hard" difficulty attribute.

The ingredient quantity feature identifier 330 may generate an attribute feature that reflects the quantity of an ingredient in a recipe relative to other recipe's quantities of that ingredient. In one embodiment, the ingredient quantity feature identifier 330 determines a standardized quantity q by converting a quantity of an ingredient in a particular unit of measure to a standard unit of measure for comparison. For example, the standardized quantity q is an ingredient's mass fraction (i.e., the ingredient's mass normalized by the total mass of ingredients in the recipe). The standardized quantity q is then compared against standardized quantities of the ingredient found in other recipes. For example, the ingredient quantity feature identifier 330 obtains the mean $\mu$ and standard deviation $\sigma$ among standardized quantities of an ingredient across recipes in the recipe store 205. The ingredient quantity feature identifier 330 then computes a normalized ingredient quantity $z=q-\mu/\rho$. Hence, the normalized ingredient quantity indicates whether a recipe has a higher than normal or a lower than normal quantity of an ingredient in terms of a number of standard deviations from the mean standardized quantity of that ingredient.

The popularity feature identifier 335 generates attribute features corresponding to popularity of a food-related term. The recipe server 120 may periodically tabulate a number of recipes mentioning a particular food-related term and store the tabulated popularity in association with the node of the food knowledge graph representing the food-related term. Alternatively or additionally, the popularity feature identifier 335 may determine popularity as part of generating an attribute feature. Popularity of a food related term in recipes roughly correlates with a typical user's knowledge of a food-related term. For example, attribute feature corresponding to a popular food-related term (e.g., sliced bread, an oven) are correlated with "easy" difficulty attributes. As another example, attribute features corresponding to a relatively rare food-related term (e.g., a durian) are correlated with a "hard to obtain" difficulty attribute.

The preparation time feature identifier 340 generates attribute features corresponding to preparation time of a recipe. The preparation time feature identifier 340 may obtain a total preparation time from an explicit total time contained in the content of a recipe. Alternatively or additionally, the preparation time feature identifier 340 infers total preparation time of a recipe from the content of the recipe, as described further in U.S. application Ser. No. 14/316,060, filed Jun. 26, 2014, which is hereby incorporated by reference in its entirety. An attribute feature corresponding to a longer total preparation time may be correlated with a "hard" difficulty attribute.

Although the attribute feature identifier 305 is described as generating attribute features from text of the recipe, the attribute feature identifier 305 may alternatively or additionally generate attribute features from images, videos, audio, animations, or other content in a recipe. For example, the recipe server 120 applies optical character recognition to recognize text in images, videos, or animations to produce text analyzable by the attribute feature identifier 305. As another example, the recipe server 120 uses speech-to-text transcription to recognize spoken text in videos or audio.

Difficulty Attributes

The training attribute identifier 345 determines training attribute indicators of training recipes, which the attribute model trainer 355 uses to determine attribute parameters of the attribute model 350. A training attribute indicator may be binary or may have a continuous value (e.g., a probabilistic assessment of whether the recipe is associated with the difficulty attribute). The training attribute identifier 345 may obtain training attribute indicators from recipes labeled with difficulty attributes. For example, an administrator of the recipe server 120 labels the difficulty of recipes, or the recipe server 120 retrieves metadata tags indicating recipe difficulty from the recipe source 110.

In one embodiment, the training attribute identifier 345 uses reviews (or other non-author comments on a recipe) to determine training attribute indicators for recipes. The recipe server 120 may obtain recipe reviews from the recipe source 110 or from recipes submitted to the recipe server 120 through the recipe browsing interface 230. The training attribute identifier 345 matches text present in reviews to particular difficulty attributes using regular expressions. For example, the training attribute identifier 345 determines that a recipe is associated with an "easy" difficulty attribute if the text "simple," "easy," or "painless" is present in a review of a recipe. The training attribute identifier 345 may employ exclusion regular expressions that prevent a negated instance of a word from incorrectly associating a recipe with a difficulty attribute. For example, the exclusion regular expression "not . . . " excludes subsequent words from influencing difficulty attributes of a recipe.

Alternatively or additionally to using regular expressions, the training attribute identifier 345 uses a machine learning classifier to determine whether a review is indicative of a difficulty attribute. The features of the machine learning classifier include different words of text or regular expressions in reviews. The machine learning classifier is trained using reviews determined to be associated with various difficulty attributes by manual classification or regular expressions. For example, the machine learning classifier is implemented using a logistic regression model or other statistical classifier.

In one embodiment, the training attribute identifier 345 imposes a threshold number or proportion of recipe reviews associated with a difficulty attribute. The training attribute identifier 345 associates the recipe with the difficulty attribute if the number or proportion of recipe reviews with qualifying text equals or exceeds the threshold. Alternatively or additionally, the training attribute identifier 345 determines the training attribute indicator as a numerical value from the proportion of reviews of a recipe having text corresponding to the difficulty attribute.

The attribute model 350 determines whether a recipe is associated with a difficulty attribute by using as inputs the attribute features generated from the content of the recipe. The output of the attribute model 350 indicates whether the recipe is associated with the difficulty attribute. For example, if the output of the attribute model 350 equals or exceeds a threshold, then the recipe is associated with the difficulty attribute. The attribute model 350 is modified by different sets of attribute parameters corresponding to different difficulty attributes. The attribute model trainer 355 determines the set of attribute parameters corresponding to a particular difficulty attribute by training the recipe model with training recipes known to be associated or not associated with the particular difficulty attribute.

To determine the attribute parameters corresponding to a difficulty attribute, the attribute model trainer 355 obtains training recipes. Training recipes include recipe content and have an associated training attribute indicator of a particular difficulty attribute, as determined by the training attribute identifier 355. The attribute model trainer 355 uses attribute features that the attribute feature identifier 315 generates for the training recipes. The attribute model trainer 350 then determines attribute parameters so that the attribute model 350 predicts whether a recipe is associated with the difficulty attribute given the attribute features of the training recipes. In one embodiment, the attribute model trainer 355 iteratively modifies the attribute parameters to decrease discrepancy between predictions of the attribute model 350 and the difficulty attribute indicators.

In one embodiment, the attribute model 350 is a logistic regression model. In the logistic regression model, a given attribute feature has a corresponding attribute parameter. The products of attribute features and their corresponding attribute parameters are summed, and a sigmoidal function is applied to the sum. In other words, the logistic regression model applies a sigmoidal function to an inner product between a vector representation of attribute features and a vector representation of corresponding attribute parameters. The resulting output is between zero and one (or in another range depending on the sigmoidal function). Hence, the output of the logistic regression model is the probability that a recipe is associated with the attribute feature. If the attribute model 350 is a logistic regression model, then the attribute model trainer 355 trains the attribute model 350 using logistic regression between the attribute features of the training recipes and the obtained difficulty attribute indicators. The determined coefficients from the logistic regression are the attribute parameters corresponding to the difficulty attribute.

In one embodiment, the attribute model 350 implements a learning to rank machine learning algorithm. For example, the attribute model 350 determines a difference vector between vectors representing attribute features of two different recipes. The inner product between the difference vector and a vector representing corresponding attribute parameters corresponds to the relative ranking between the two different recipes. To train the learning to rank algorithm, the attribute model trainer 355 ranks the training recipes by the difficulty attribute indicator (e.g., proportion of reviews for a recipe indicating that the recipe is associated with the difficulty attribute). Alternatively, the difficulty attribute indicator is a difficulty attribute representing a discretization of difficulty (e.g., "easy," "medium," or "hard"), and the attribute model trainer 355 ranks recipes according to their respective difficulty attribute indicators (e.g., "easy" recipes are ranked below "medium" recipes, which are ranked below "hard" recipes). The attribute model trainer 355 determines attribute parameters so that a ranking of the training recipes by the output of the attribute model 350 corresponds to the ranking of the training recipes by their training attribute indicators. If the attribute model 350 implements learning to rank using a logistic regression model, then the attribute model trainer 355 may efficiently determine the attribute parameters using logistic regression.

The attribute model trainer 355 may incorporate an objective function to determine "optimal" attribute parameters. For example, the objective function indicates discrepancy between output of the attribute model 350 and the training attribute indicators of the training recipes (e.g., sum-squared error). Alternatively, the objective function is a likelihood function (or a log-likelihood function) indicating a probability that the attribute parameters predict the attribute indicators for the input attribute features. The attribute model trainer 355 may determine attribute parameters by optimizing the objective function. Optimizing the objective function includes minimizing the objective function (for a measure of discrepancy) or maximizing the objective function (for a likelihood function).

Optionally, the attribute model trainer 355 may implement a regularizer term in its objective function (e.g., an addition to an error term, a subtraction from a likelihood function) to avoid over-fitting of data. For example, a L1 regularizer subtracts the sum of the attribute parameters' magnitudes (i.e., the L1 norm, the "taxicab" distance of a vector of the attribute parameters from the origin) from a likelihood-based objective function. Performing L1 regularization (or some other regularization) may result in some attribute parameters having a value of zero (or a substantially negligible value). Attribute features associated with these attribute parameters having a value of zero (or a value with a magnitude below a threshold) may be omitted from the attribute model 350, which beneficially reduces computational time to subsequently determine whether a recipe is associated with a difficulty attribute.

It should be noted that attribute parameters are associated with a particular difficulty attribute and do not vary with respect to which recipe is input to the attribute model 350. In contrast to attribute parameters, attribute features are associated with a particular recipe and do not vary with respect to the various difficulty attributes for which the attribute model 350 determines outputs.

In sum, the attribute engine 215 determines whether a recipe is associated with a difficulty attribute by generating attribute features for a recipe (by the attribute feature identifier 305), obtaining attribute parameters (as determined by the attribute model trainer 355), and then determining the output of the attribute model 350 for the attribute features and attribute parameters. This output of the attribute model 350 indicates whether the recipe is associated with the difficulty attribute. In one embodiment, the attribute engine 215 determines that a recipe is associated with a difficulty attribute if the output equals or exceeds a threshold. For example, the threshold may be an output corresponding to a threshold ranking of recipes by output from the attribute model 350.

Although the training attribute identifier 345 may infer difficulty attributes of a recipe from its reviews, not all recipes have corresponding reviews (or sufficient reviews for accurate inference of difficulty attributes). The attribute model trainer 355 determines attribute parameters so that that the attribute model 350 can infer difficulty attributes of a recipe from the content of the recipe. Hence, the attribute model 350 is applicable to recipes regardless of whether they have corresponding reviews.

Recipe Attribute Inference

Figure 4:
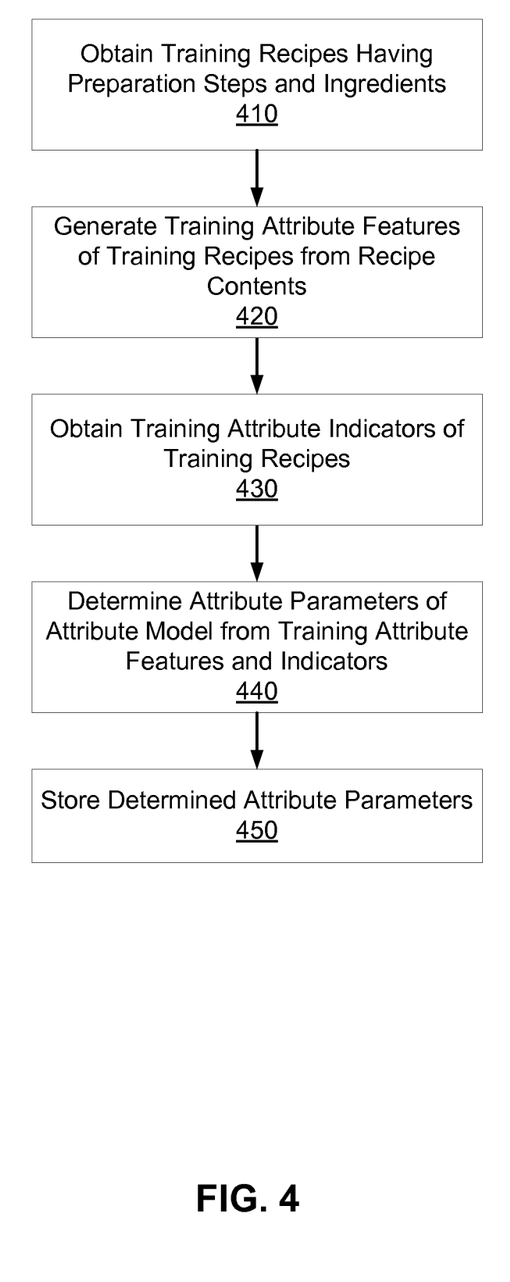
FIG. 4 is a flowchart illustrating a method for training a recipe model to determine attribute parameters, in accordance with an embodiment.

FIG. 4 is a flowchart illustrating a method for training a recipe model to determine attribute parameters, in accordance with an embodiment. The recipe server 120 obtains 410 training recipes (e.g., from a recipe source 110, from the recipe store 205) having training recipe contents such as training preparation steps and training ingredients.

From the obtained recipe, the attribute feature identifier 305 generates 420 training attribute features from the training recipe contents. These training attribute features represent portions of the training recipes correlated with difficulty of preparing the food item that the recipe describes. For example, the attribute feature identifier 305 generates 420 training attribute features by matching text of the preparation steps to nodes of a food knowledge graph. Other example training attribute features correspond to text or a total preparation time of the training recipe.

The training attribute identifier 345 obtains 430 training indicators of an associated difficulty attribute. For example, the training attribute indicators are determined based on text of reviews of the training recipes. The training attribute indicators may also be obtained 430 through manual classification or from tags present in the recipe source 110.

The attribute model trainer 355 determines 440 the attribute parameters by training the attribute model 350 to predict whether the training recipes are associated with the difficulty attribute based on the generated training features. For example, the attribute model trainer 355 determines 440 attribute parameters that minimize discrepancy between output of the attribute model 350 and the obtained training attribute indicators.

The attribute engine 215 then optionally stores 450 the determined attribute parameters associated with attribute features for later use by the attribute engine 215 for determining whether recipes (without training attribute indicators) are associated with a difficulty attribute.

Attribute parameter determination may be performed as a batch process (e.g., periodically), or attribute parameters may be updated based on attribute parameters determined from previously unconsidered training recipes. For example, the attribute model trainer 355 updates the attribute parameters using a weighted average between previously determined attribute parameters and attribute parameters determined for the previously unconsidered training recipes.

Figure 5:
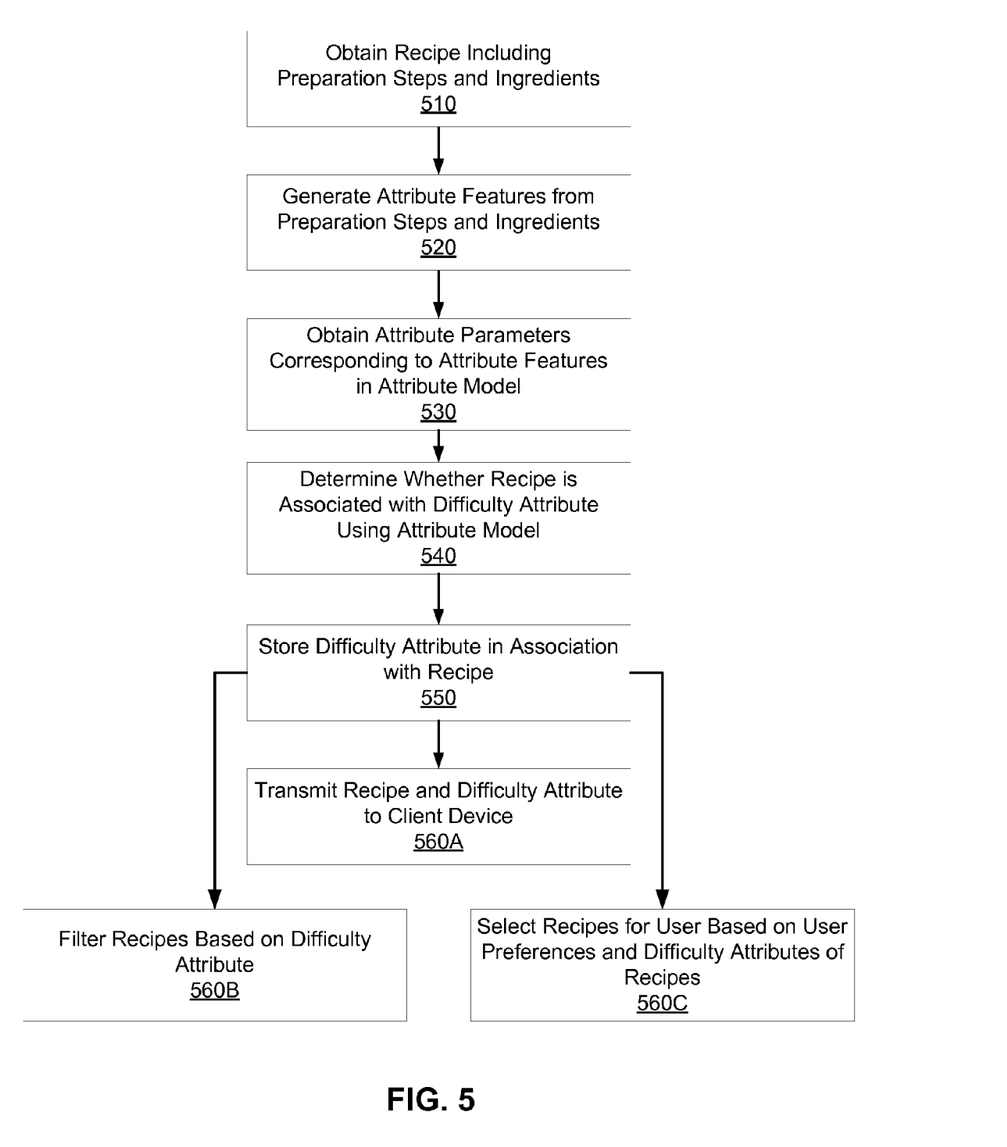
FIG. 5 is a flowchart illustrating a method for determining whether a recipe is associated with a difficulty attribute, in accordance with an embodiment.

FIG. 5 is a flowchart illustrating a method for determining whether a recipe is associated with a difficulty attribute, in accordance with an embodiment. The recipe server 120 obtains 510 recipes (e.g., from a recipe source 110, from the recipe store 205) having recipe contents such as preparation steps and ingredients.

From the obtained recipe, the attribute feature identifier 305 generates 520 attribute features from the recipe contents. These attribute features represent portions of the recipes correlated with the difficulty of preparing the food item that the recipe describes. For example, the attribute feature identifier 305 generates 520 attribute features from text in the recipe corresponding to a node of a food knowledge graph. The attribute feature identifier 305 may also generate 520 attribute features corresponding to an abstraction of a node in the food knowledge graph or incidence of an attribute feature among other recipes in the recipe store 205 (i.e., popularity of a recipe feature). Other example training attribute features correspond to text or a total preparation time of the training recipe.

The attribute engine 215 obtains 530 attribute parameters corresponding to the generated attribute features in the attribute model 350. Obtaining attribute parameters includes retrieving stored attribute parameters or determining attribute parameters. For example, the attribute model trainer 355 determines the attribute parameters as described with respect to FIG. 4.

The attribute engine 215 determines 540 whether the recipe is associated with the difficulty attribute using the attribute model 540. The attribute engine 215 uses the generated attribute features as inputs to the attribute model 350 modified by the obtained attribute parameters. The output of the attribute model 350 corresponds to whether the recipe is associated with the difficulty attribute. For example, the attribute engine 215 determines 540 that the recipe is associated with the difficulty attribute in response to the output equaling or exceeding a threshold output. As another example, the attribute engine 215 determines a ranking of the recipe among other recipes according to the output of the attribute model 350. In this example, the attribute engine 215 determines that the recipe is associated with the difficulty attribute in response to determining that the recipe's ranking among the other recipes equaling or exceeding a threshold ranking.

The attribute engine 215 optionally stores 550 the difficulty attribute in association with the recipe if the attribute engine 215 determines that the difficulty attribute is indeed associated with the recipe.

The recipe server 120 may use the difficulty attribute associated with a recipe for various functions. For instance, the recipe server 120 includes the difficulty attribute as part of presenting the recipe in a recipe browsing interface 230. When a client device 130 requests to view the recipe, the recipe server 120 transmits 560A the recipe including the difficulty attribute to the client device 130.

The recipe server 120 may also filter 560B search results (or other requests for recipes) based on criteria specifying the difficulty attribute. For example, the recipe server 120 receives a request from a client device 130 for recipes having (or not having) a difficulty attribute. The recipe search engine 235 determines which recipes have the difficulty attributes meeting the specified criteria and transmits those recipes that do fit the criteria to the client device 130.

The recipe recommendation engine 240 may select 560C recipes for a user based at least in part on user preferences of the user and difficulty attributes of the recipes. For example, the user preferences include a binary filter based on difficulty attribute criterion, or the user preferences indicate a relationship between presence of a difficulty attribute (e.g., "easy") and the user's reported enjoyment of recipes (e.g., as indicated through a feedback mechanism in the recipe browsing interface 230). Thus, the recipe server 120 may use the difficulty attribute in one or more different contexts.

Example Recipe

Figure 6:
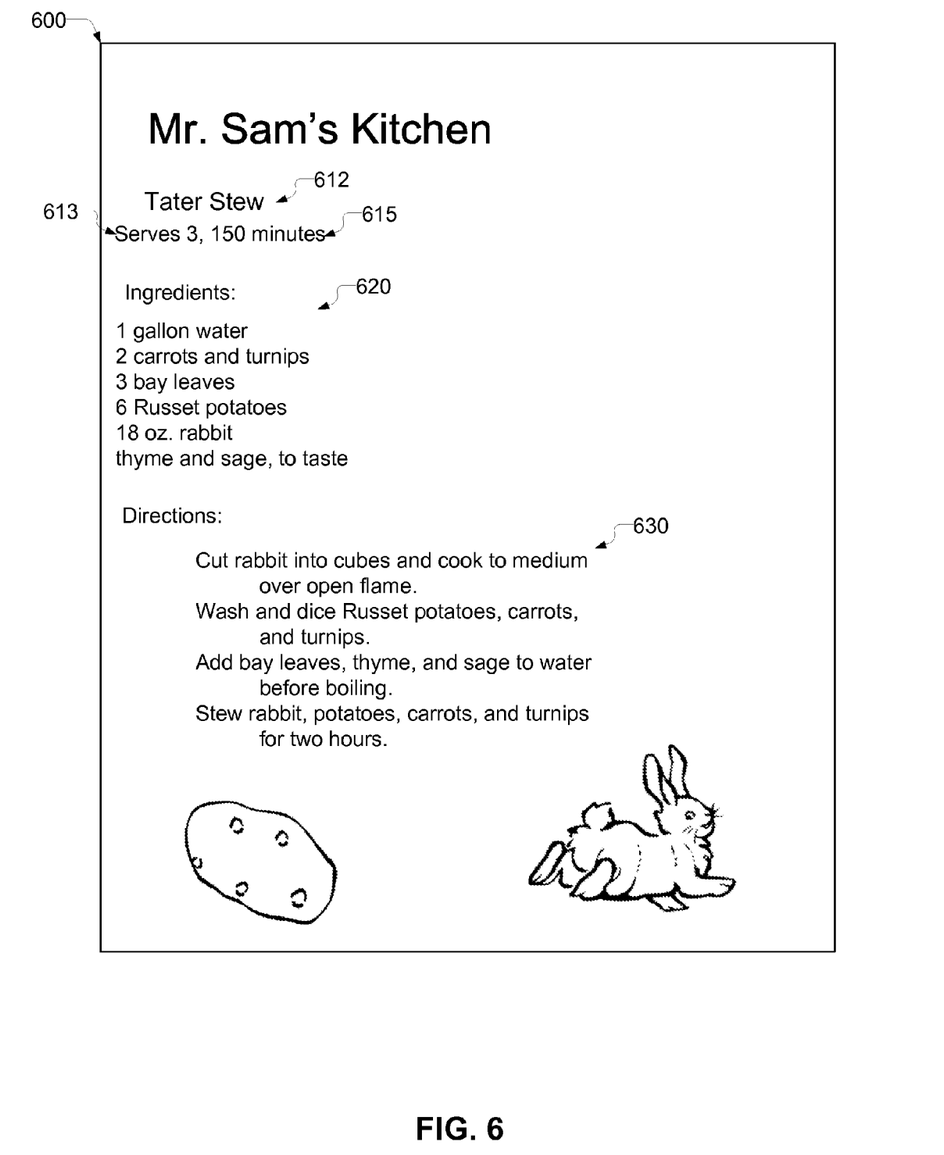
FIG. 6 illustrates an example recipe from a recipe source, in accordance with an embodiment.

FIG. 6 illustrates an example recipe 600 from a recipe source 110 with example recipe component classifications, in accordance with an embodiment. The content of the recipe includes a title 612, a serving size 613, a total preparation time 615, ingredients 620, and preparation steps 630. The attribute feature identifier 305 may identify attribute features from any portion of the recipe content.

The serving size 613 is relatively low, so the ingredient quantity feature identifier 330 generates an example feature indicating a low number of servings, which is correlated with a recipe having an "easy" difficulty attribute. On the other hand, the total preparation time 615 is relatively high, so the preparation time feature identifier 340 generates an example feature indicating a long preparation time, which is correlated with a recipe not having a "quick and easy" difficulty attribute.

The ingredients 620 include carrots, rabbit, and Russet potatoes. The graph feature identifier 310 generates example attribute features corresponding to carrot and rabbit. These example attribute features are correlated with "easy" and "hard" difficulty attributes respectively. The popularity feature identifier 335 may determine that rabbit is a relatively obscure ingredient (based on other recipes in the recipe store 205) and generate an attribute feature indicating that the recipe includes an uncommon ingredient. This example attribute feature is correlated with a "specialized knowledge" difficulty attribute. The ancestor feature identifier 320 may generate an attribute feature representing a potato to supplement or replace the attribute feature representing the Russet potato because potato is an abstraction of potato in the food knowledge graph. Such an attribute feature may improve data quality when dealing with less common ingredients.

The preparation steps 630 include an instruction to cook the rabbit to medium over an open flame. The combination feature identifier 315 identifies an example attribute feature corresponding to the pair of nodes representing the rabbit and the open flame. This pair is associated with a "hard" difficulty attribute. The text feature identifier 325 identifies an example attribute feature corresponding to the text "cook to medium," which is not correlated strongly with an "easy" or "hard" difficulty attribute.

Knowledge Graph

Figure 7A:
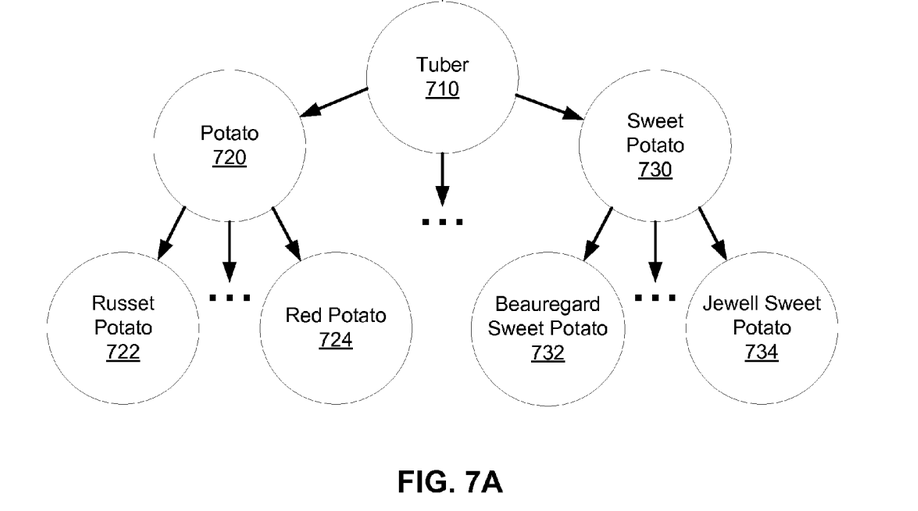
FIGS. 7A and 7B are conceptual diagrams illustrating example sections of the knowledge graph, in accordance with an embodiment.
Figure 7B:
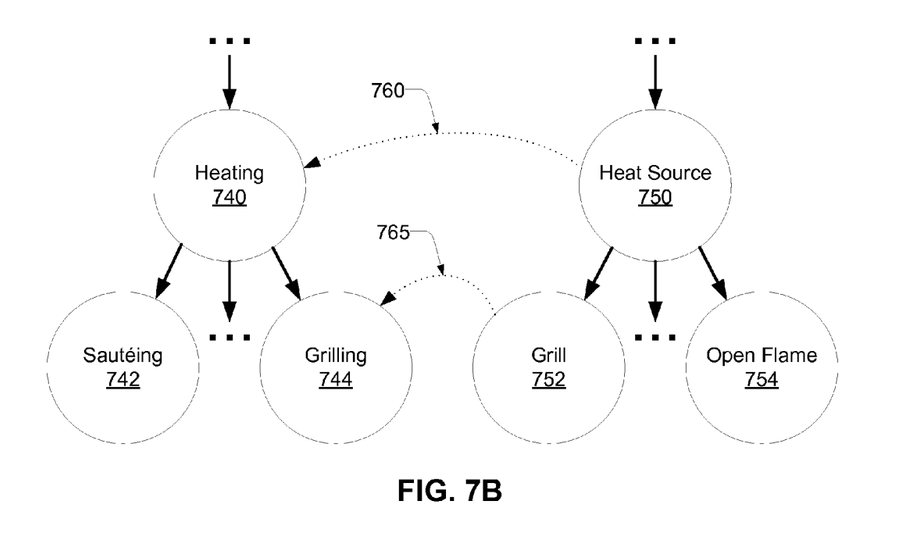

FIGS. 7A and 7B are conceptual diagrams illustrating example sections of the knowledge graph, in accordance with an embodiment. The example section of the knowledge graph illustrated in FIG. 7A includes nodes representing ingredients such as a Russet potato 722, a red potato 724, a Beauregard sweet potato 732, and a Jewell sweet potato 734. The example section also includes abstractions of ingredients including a potato 720, a sweet potato 730, and a tuber 710. The directed edges indicate relationships among the nodes of the illustrated section. In this case, an edge from a first node to a second node indicates that the second node represents an instance of an abstraction represented by the first node. For example, a Russet potato 722 and a red potato 724 are instances of a potato 720, and the potato 720 and the sweet potato 730 are instances of the tuber 710. The ellipses indicate that the illustrated section is an excerpt of an example knowledge graph from the knowledge graph store 210. For instance, the tuber 710 is an instance of the abstraction "root vegetable," and there are additional types of potatoes 710, sweet potatoes 720, and tubers 730. Hence, the knowledge graph organizes food information.

The example sections of the knowledge graph illustrated in FIG. 7B include nodes representing cooking techniques and cooking equipment, respectively. Similar to the section of the graph representing ingredients, a directed edge from a first node to a second node indicates that the second node represents an instance of an abstraction represented by the first node. Thus, the cooking techniques sautéing 742 and grilling 744 are instances of cooking 740, which is a cooking technique abstraction. The cooking equipment grill 752 and open flame 754 are instances of the cooking equipment abstraction heat source 750. The directed edges 760 and 765 from nodes representing cooking equipment to nodes representing cooking techniques indicate that the cooking equipment is used to perform the cooking technique. For example, the directed edge 760 indicates that a heat source 750 is used for heating 740, and the directed edge 765 indicates that a grill 752 is used for grilling 744.

The attribute feature identifier 305 may use the food knowledge graph in inferring a difficulty attribute of a recipe. When there is insufficient training data to use an attribute feature associated with recipe content, the attribute feature identifier 305 may use the food knowledge graph to generate a replacement attribute feature. This replacement attribute feature may be an abstraction of a cooking technique, cooking equipment, or an ingredient in the unused attribute feature. For example, if the attribute feature corresponding to the ingredient "Russett potatoes" has insufficient data to calculate a corresponding attribute parameter, the attribute feature identifier 305 may substitute an attribute feature corresponding to the ingredient abstraction "potatoes" because Russet potatoes 722 are an instance of potatoes 720 in the food knowledge graph. As another example, if there is insufficient training data to determine the attribute parameter associated with the cooking equipment open flame 754, then the attribute feature identifier 305 uses an attribute associated with the cooking equipment heat source 750.

Computer System

Figure 8:
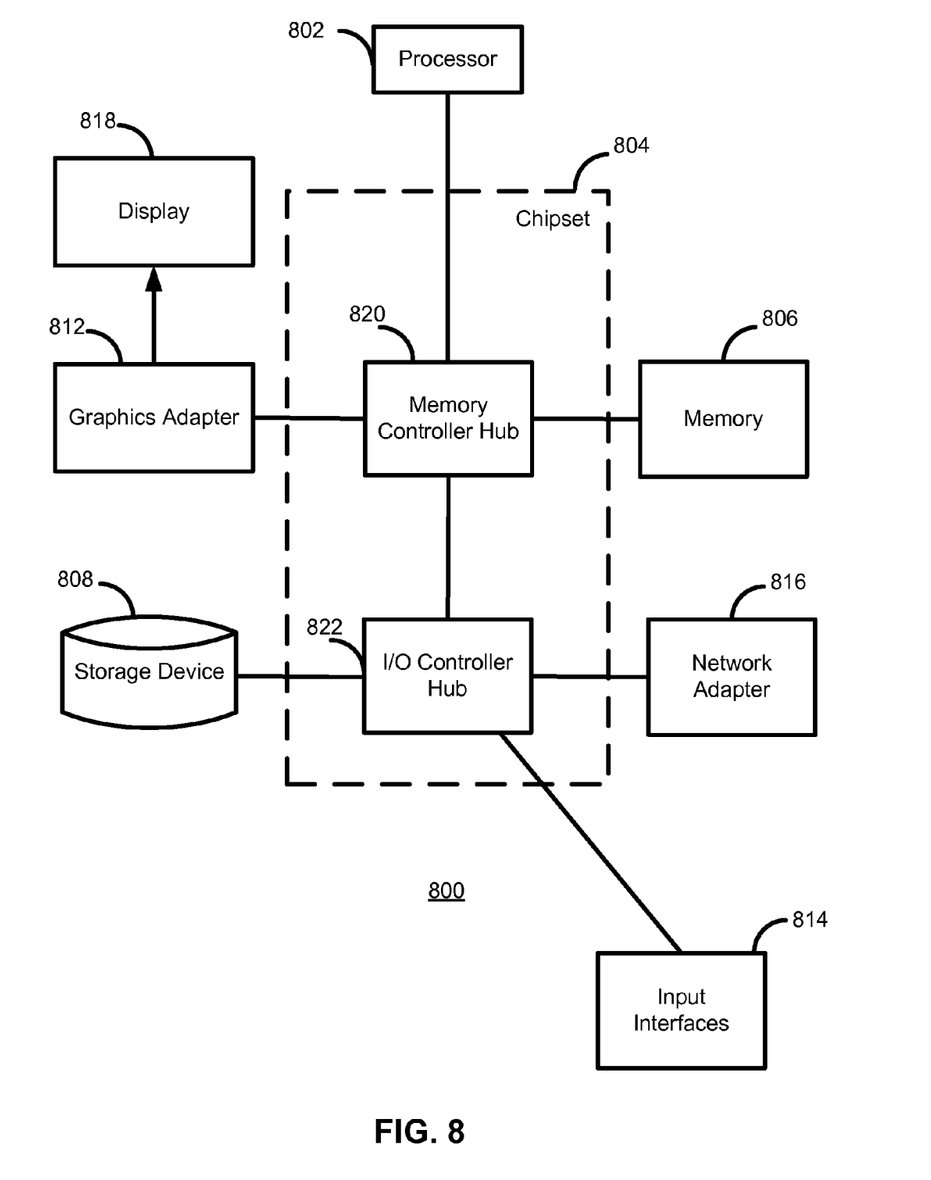
FIG. 8 is a block diagram illustrating an example computer for implementing the entities such as the recipe server shown in FIG. 2, in accordance with an embodiment.

FIG. 8 is a block diagram illustrating an example computer for implementing the entities such as the recipe server 120 shown in FIG. 1, in accordance with an embodiment. The computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, input interfaces 814, and network adapter 816 are coupled to the I/O controller hub 822. Other embodiments of the computer 800 have different architectures.

The storage device 808 is a non-transitory computer-readable storage medium such as a hard drive, compact disk read-only memory (CD-ROM), DVD, or a solid-state memory device. The memory 806 holds instructions and data used by the processor 802. The input interfaces 814 may include a touch-screen interface, a mouse, track ball, or other type of pointing device, a keyboard, a scanner or other conventional digitizer, or some combination thereof, and is used to input data into the computer 800. The graphics adapter 812 displays images and other information on the display 818. The network adapter 816 couples the computer 800 to one or more computer networks.

The computer 800 is adapted to execute computer program modules (e.g., the attribute engine 215, the attribute feature identifier 305, the attribute model 350) for recipe difficulty inference. As used herein, the term "module" refers to computer program logic used to provide the specified functionality. Thus, a module may be implemented in hardware, firmware, and/or software. In one embodiment, program modules are stored on the storage device 808, loaded into the memory 806, and executed by the processor 802.

The type of computer 800 used by the entities of the environment 80 can vary depending upon the embodiment. For example, the recipe source 110 or recipe server 120 may include multiple computers 800 communicating with each other through the network 140 to provide the functionality described herein. Such computers 800 may lack some of the components described above, such as graphics adapters 812 and displays 818. As another example, the client device 130 is implemented on a mobile device, laptop, or tablet containing at least some of the components of the computer 800.

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The modules described herein represent an implementation of one embodiment, but various other embodiments may include additional, fewer, or different modules to implement the methods, systems, or non-transitory, computer-readable media delineated in the accompanying claims. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for inferring difficulty of a recipe, the method comprising:
   obtaining a recipe comprising ingredients in a food item described by the recipe and further comprising preparation steps describing how to prepare the food item;
   generating attribute features correlated to a difficulty attribute of recipes, the attribute features generated from at least one of: the ingredients and the preparation steps;
   obtaining attribute parameters corresponding to the generated attribute features in an attribute model, the attribute parameters specific to the difficulty attribute;
   determining, by a processor, whether the recipe is associated with the difficulty attribute by using the generated attribute features as inputs to the attribute model modified by the obtained attribute parameters;
   storing the difficulty attribute in association with the recipe; and
   in response to a request for the recipe from a client device, providing the recipe and the difficulty attribute to the client device, thereby causing the client device to present the recipe and the difficulty attribute to a user of the client device.

2. The method of claim 1, wherein generating the attribute features comprises:
   generating a first attribute feature from text in the recipe, the text corresponding to a first node of a food knowledge graph, the first node representing at least one of: an ingredient, a cooking technique, and cooking equipment.

3. The method of claim 2, wherein generating the attribute features comprises:
   generating a second attribute feature representative of incidence of the first attribute feature among a plurality of additional recipes.

4. The method of claim 2, wherein generating the attribute features comprises:
   generating a second attribute feature corresponding to a second node of the food knowledge graph, the second node representing an abstraction of the first node.

5. The method of claim 1, wherein generating the attribute features comprises:
   generating an attribute feature representing a quantity of an ingredient of the recipe relative to an average quantity of the ingredient across a plurality of recipes.

6. The method of claim 1, wherein the attribute model is a machine learning algorithm, the method further comprising:

generating training attribute features of training recipes from at least one of: training ingredients of the training recipes and training preparation steps of the training recipes;

obtaining training attribute indicators reflecting whether the training recipes are associated with the difficulty attribute; and determining the attribute parameters by training the attribute model to predict whether the training recipes are associated with the difficulty attribute based on the generated training features, the attribute model trained to minimize discrepancy between output of the attribute model and the obtained training attribute indicators.

7. The method of claim 6, wherein obtaining the training attribute indicators comprises:

determining whether the training recipes are associated with the difficulty attribute based on text of reviews of the training recipes.

8. The method of claim 1, wherein determining whether the recipe is associated with the difficulty attribute comprises:

determining that the recipe is associated with the difficulty attribute in response to an output of the attribute model equaling or exceeding a threshold output.

9. The method of claim 1, wherein determining whether the recipe is associated with the difficulty attribute comprises:

determining a ranking of the recipe among additional recipes according the an output of the attribute model compared to outputs of the attribute model for the additional recipes; and determining that the recipe is associated with the difficulty attribute in response to the ranking of the recipe among the additional recipes equaling or exceeding a threshold ranking.

10. A non-transitory, computer-readable storage medium comprising instructions for inferring difficulty of a recipe, the instructions when executed by a processor cause the processor to:

obtain a recipe comprising ingredients in a food item described by the recipe and further comprising preparation steps describing how to prepare the food item;

generate attribute features correlated to a difficulty attribute of recipes, the attribute features generated from at least one of: the ingredients and the preparation steps;

obtain attribute parameters corresponding to the generated attribute features in an attribute model, the attribute parameters specific to the difficulty attribute;

determine whether the recipe is associated with the difficulty attribute by using the generated attribute features as inputs to the attribute model modified by the obtained attribute parameters; and store the difficulty attribute in association with the recipe; and in response to a request for the recipe from a client device, providing the recipe and the difficulty attribute to the client device, thereby causing the client device to present the recipe and the difficulty attribute to a user of the client device.

11. The computer-readable storage medium of claim 10, wherein generating the attribute features comprises:

generating a first attribute feature from text in the recipe, the text corresponding to a first node of a food knowledge graph, the first node representing at least one of: an ingredient, a cooking technique, and cooking equipment.

12. The computer-readable storage medium of claim 11, wherein generating the attribute features comprises:

generating a second attribute feature corresponding to a second node of the food knowledge graph, the second node representing an abstraction of the first node.

13. The computer-readable storage medium of claim 10, wherein the attribute model is a machine learning algorithm, the instructions further comprising instructions causing the processor to:

generate training attribute features of training recipes from at least one of: training ingredients of the training recipes and training preparation steps of the training recipes;

obtain training attribute indicators reflecting whether the training recipes are associated with the difficulty attribute; and determine the attribute parameters by training the attribute model to predict whether the training recipes are associated with the difficulty attribute based on the generated training features, the attribute model trained to minimize discrepancy between output of the attribute model and the obtained training attribute indicators.

14. A system for selecting a representative image for a recipe from among a plurality of recipe images, the system comprising:

a processor; and a non-transitory, computer-readable storage medium comprising instructions executable by the processor, the instructions for:

obtaining a recipe comprising ingredients in a food item described by the recipe and further comprising preparation steps describing how to prepare the food item;

generating attribute features correlated to a difficulty attribute of recipes, the attribute features generated from at least one of: the ingredients and the preparation steps;

obtaining attribute parameters corresponding to the generated attribute features in an attribute model, the attribute parameters specific to the difficulty attribute;

determining whether the recipe is associated with the difficulty attribute by using the generated attribute features as inputs to the attribute model modified by the obtained attribute parameters;

storing the difficulty attribute in association with the recipe; and in response to a request for the recipe from a client device, providing the recipe and the difficulty attribute to the client device, thereby causing the client device to present the recipe and the difficulty attribute to a user of the client device.

15. A computer-implemented method for inferring difficulty of a recipe, the method comprising:

obtaining a recipe comprising ingredients in a food item described by the recipe and further comprising preparation steps describing how to prepare the food item;

generating attribute features correlated to a difficulty attribute of recipes, the attribute features generated from at least one of: the ingredients and the preparation steps;

obtaining attribute parameters corresponding to the generated attribute features in an attribute model, the attribute parameters specific to the difficulty attribute;

determining, by a processor, whether the recipe is associated with the difficulty attribute by using the generated attribute features as inputs to the attribute model modified by the obtained attribute parameters;

storing the difficulty attribute in association with the recipe in a database storing a plurality of recipes and associated difficulty attributes of the plurality of recipes;

receiving a request for recipes from a client device, the request specifying the difficulty attribute;

identifying, from the plurality of recipes in the database, recipes associated with the specified difficulty attribute, the identified recipes including the obtained recipe; and providing the identified recipes to the client device, thereby causing the client device to present the identified recipes to a user of the client device.

16. The method of claim 15, wherein generating the attribute features comprises:

generating an attribute feature from text in the recipe, the text corresponding to a node of a food knowledge graph, the node representing at least one of: an ingredient, a cooking technique, and cooking equipment.

17. The method of claim 15, wherein the attribute model is a machine learning algorithm, the method further comprising:

generating training attribute features of training recipes from at least one of: training ingredients of the training recipes and training preparation steps of the training recipes;

obtaining training attribute indicators reflecting whether the training recipes are associated with the difficulty attribute; and determining the attribute parameters by training the attribute model to predict whether the training recipes are associated with the difficulty attribute based on the generated training features, the attribute model trained to minimize discrepancy between output of the attribute model and the obtained training attribute indicators.

18. A computer-implemented method for inferring difficulty of a recipe, the method comprising:

obtaining a recipe comprising ingredients in a food item described by the recipe and further comprising preparation steps describing how to prepare the food item;

generating attribute features correlated to a difficulty attribute of recipes, the attribute features generated from at least one of: the ingredients and the preparation steps;

obtaining attribute parameters corresponding to the generated attribute features in an attribute model, the attribute parameters specific to the difficulty attribute;

determining, by a processor, whether the recipe is associated with the difficulty attribute by using the generated attribute features as inputs to the attribute model modified by the obtained attribute parameters;

storing the difficulty attribute in association with the recipe in a database storing a plurality of recipes and associated difficulty attributes of the plurality of recipes;

receiving a request for recipes from a client device associated with a user profile including a user recipe difficulty preference;

selecting, from the plurality of recipes stored in the database, recipes to recommend based on the user recipe difficulty preference and difficulty attributes associated with the selected recipes, the selected recipes including the obtained recipe; and providing the selected recipes to the client device, thereby causing the client device to present the selected recipes to a user of the client device.

19. The method of claim 18, wherein generating the attribute features comprises:

generating an attribute feature from text in the recipe, the text corresponding to a node of a food knowledge graph, the node representing at least one of: an ingredient, a cooking technique, and cooking equipment.

20. The method of claim 18, wherein the attribute model is a machine learning algorithm, the method further comprising:

generating training attribute features of training recipes from at least one of: training ingredients of the training recipes and training preparation steps of the training recipes;

obtaining training attribute indicators reflecting whether the training recipes are associated with the difficulty attribute; and determining the attribute parameters by training the attribute model to predict whether the training recipes are associated with the difficulty attribute based on the generated training features, the attribute model trained to minimize discrepancy between output of the attribute model and the obtained training attribute indicators.

\* \* \* \* \*